United States Patent
Starck

(10) Patent No.: US 8,680,437 B2
(45) Date of Patent: Mar. 25, 2014

(54) HEATING SYSTEM

(75) Inventor: Roland Starck, Bellheim (DE)

(73) Assignee: Eichenauer Heizelemente GmbH & Co. KG, Kandel (DE)

( * ) Notice: Subject to any disclaimer, the term of this patent is extended or adjusted under 35 U.S.C. 154(b) by 1501 days.

(21) Appl. No.: 11/989,799

(22) PCT Filed: Jul. 22, 2006

(86) PCT No.: PCT/EP2006/007229
§ 371 (c)(1),
(2), (4) Date: Jan. 31, 2008

(87) PCT Pub. No.: WO2007/017080
PCT Pub. Date: Feb. 15, 2007

(65) Prior Publication Data
US 2009/0078692 A1    Mar. 26, 2009

(30) Foreign Application Priority Data
Aug. 6, 2005  (DE) .................. 10 2005 037 201

(51) Int. Cl.
  H05B 1/00  (2006.01)
  F24H 1/10  (2006.01)
(52) U.S. Cl.
  USPC ......................................... 219/205; 392/478
(58) Field of Classification Search
  USPC .......... 219/202, 205; 392/465, 468, 478–490;
                      123/196 A, 543, 549, 550, 557, 558
  See application file for complete search history.

(56) References Cited

U.S. PATENT DOCUMENTS

| | | | |
|---|---|---|---|
| 3,234,357 A * | 2/1966 | Seuthe .......................... | 392/403 |
| 3,584,196 A * | 6/1971 | Kurokawa et al. ............ | 219/435 |
| 4,395,996 A * | 8/1983 | Davis ............................ | 123/557 |
| 4,477,715 A | 10/1984 | Bell et al. | |
| 4,600,825 A * | 7/1986 | Blazejovsky ................. | 219/205 |
| 4,603,244 A * | 7/1986 | Genz ............................. | 219/205 |
| 4,684,786 A * | 8/1987 | Mann et al. ................... | 392/441 |
| 5,884,475 A | 3/1999 | Hofmann et al. | |
| 6,063,350 A | 5/2000 | Tarabulski et al. | |
| 6,839,508 B2 * | 1/2005 | Biess et al. .................... | 392/462 |
| 2004/0025498 A1 | 2/2004 | Lambert et al. | |
| 2005/0063689 A1 | 3/2005 | Auber | |
| 2006/0236679 A1 | 10/2006 | Meyer et al. | |

FOREIGN PATENT DOCUMENTS

| | | |
|---|---|---|
| CN | 1150219 A | 5/1997 |
| CN | 2296406 Y | 4/1998 |
| DE | 41 08 035 A1 | 9/1992 |
| DE | 201 21 115 U1 | 5/2003 |
| DE | 102 56 727 A1 | 6/2004 |
| EP | 0 566 767 A1 | 10/1993 |
| EP | 0 928 884 A2 | 7/1999 |
| JP | 2000-27627 A | 1/2000 |
| WO | WO 2005/066471 A1 | 7/2005 |

* cited by examiner

*Primary Examiner* — Sang Y Paik
(74) *Attorney, Agent, or Firm* — Hackler Daghighian & Martino

(57) ABSTRACT

The invention relates to a heating system for a liquid conveyor system, particularly for a urea supply system of a catalytic converter of an internal combustion engine, comprising at least one first heater (4) for defrosting a liquid, and at least one filter heater (14) for heating a filter (5) for liquid filtering, wherein the filter heater (14) is formed by a heating section—designed as a resistance heating element—of an electrical connecting line (12) of the first heater (4).

21 Claims, 3 Drawing Sheets

HEATING SYSTEM

This invention relates to a heating system for a liquid conveyor system, particularly for a urea supply system of a catalytic converter of an internal combustion engine.

A catalytic converter requires urea as ammonia supplier. Motor vehicles accordingly have a urea tank as a standard in which urea solution is stored for the catalytic converter. In frosty weather, the urea solution can freeze up so that a heating system is required to defrost the urea solution as quickly as possible so that the urea required for catalytic converter operation can be made available.

It is the objective of the invention to show an economical way of how a catalytic converter of an internal combustion engine can be put faster into working condition at temperatures below freezing.

This problem is solved by a heating system for a liquid conveyor system, particularly for a urea supply system of a catalytic converter of an internal combustion engine, comprising at least one first heater for defrosting a liquid, and at least one filter heater for heating a filter for liquid filtering; the filter heater is formed by a heating section—designed as a resistance heating element—of an electrical connecting line of the first heater.

The first heater may be, for example, a tank heater for heating a liquid tank and/or a pump heater for heating a conveyor pump of the liquid conveyor system. It is preferred in any case that the heat output of the first heater is higher than the heat output of the filter heater. It is possible here that the liquid conveyor system comprises a plurality of first heaters—for example, one tank heater and one pump heater—and/or a plurality of filters with filter heaters. In that case, it is generally favorable that the heat output of the first heaters is selected respectively higher than the heat outputs of the filter heater or filter heaters.

It was found within the scope of the invention that, even when a pump and/or a tank heater is used, a fairly long time can frequently pass until liquid urea solution can be provided to a catalytic converter since the urea ice particularly contained in a urea filter defrosts only slowly. In this respect, a heating system according to the invention can provide an extremely economical remedy since the filter is heated with a filter heater formed by a connecting line—designed as a resistance heating element—of the first heater designed as a tank or pump heater. The costs of a separate heater insert for the filter can thus be saved, and no additional connecting lines for the filter heater are required.

BRIEF DESCRIPTION OF THE DRAWINGS

Additional details and advantages of the invention are explained on the basis of exemplary embodiments with reference to the enclosed drawings. Identical and corresponding components are partly designated with matching reference symbols. The features described in the following can be used individually or in combination to create preferred embodiments of the invention. In the Figures.

DETAILED DESCRIPTION

Figure 1:
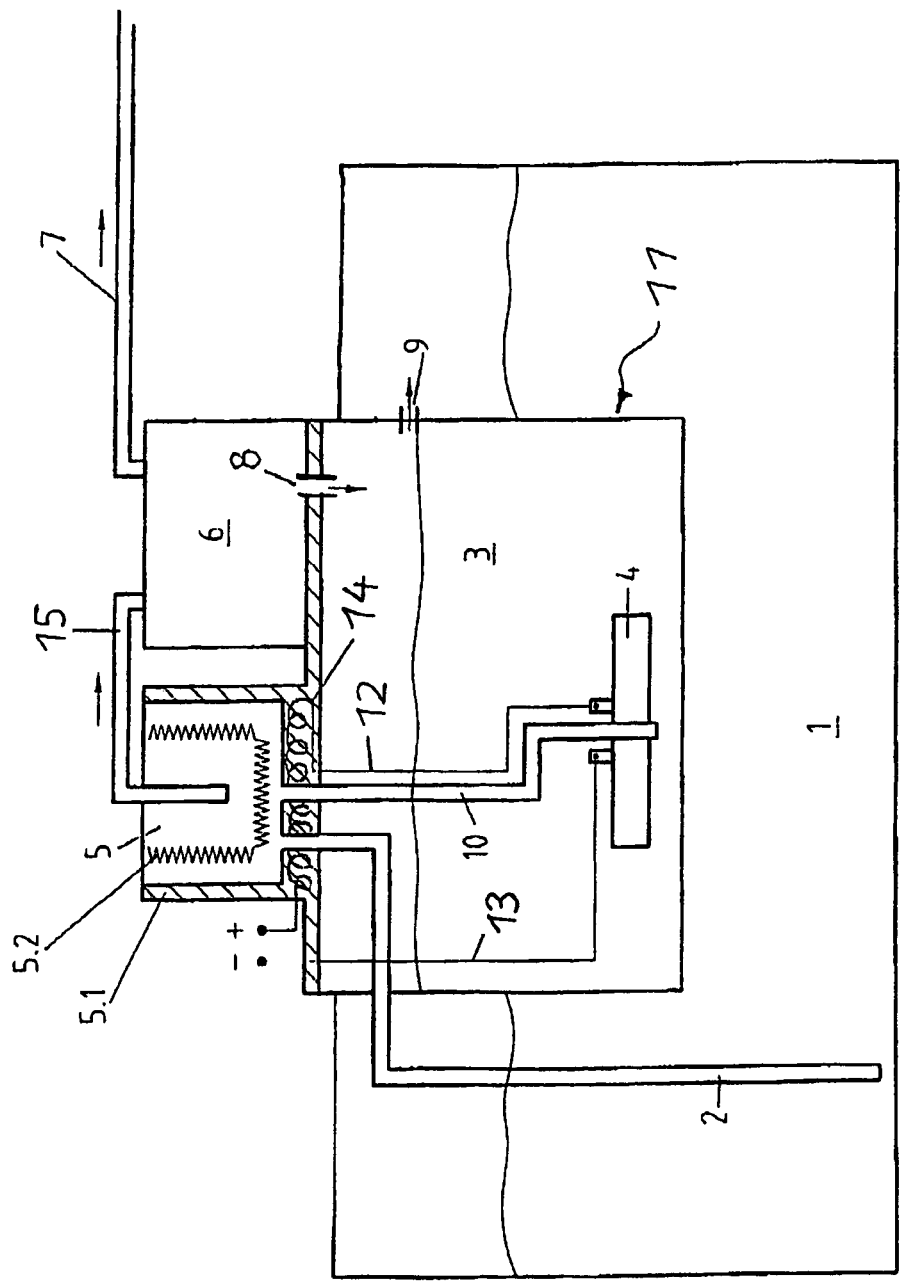
FIG. 1 shows a schematic presentation of an exemplary embodiment of a heating system according to the invention.

FIG. 1 shows a section of a urea supply system for a catalytic converter of a motor vehicle. The system comprises a dual urea tank in which a first part comprises an only indirectly heated storage tank 1 and a second part a defrosting vessel 3 heated by the tank heater 4. In the exemplary embodiment shown, the defrosting vessel 3 is provided within the storage tank 1; however, it can basically also be provided outside. A one-piece design is also possible in which the storage tank 1 is directly heated.

The heating system shown in FIG. 1 concerns an insert 11 for a storage tank 1 of a motor vehicle. The insert 11 comprises a defrosting vessel 3 for fast defrosting of a part of the urea volume stored in the storage tank 1; also, a filter housing in the form of a filter cup 5.1 for the reception of a filter element 5.2, a tank heater 4 for defrosting urea ice in the defrosting vessel 3, and connecting lines 12, 13 by means of which a heating current can be conducted through a PTC heating element (not shown) included in the tank heater 4.

The filter 5 is heatable by means of a filter heater 14 which is formed by a heating section of the connecting line 12, the heating section being designed as a resistance heating element. The same heating current thus always flows through the filter heater 14 as well as through the tank heater 4. Consequently, the PTC heating element of the tank heater 4 automatically limits the heat output of the tank heater 4 as well as of the filter heater 14, and overheating is impossible since PTC heating elements (positive temperature coefficient) show a sudden increase in their electric resistance when a threshold temperature is exceeded.

The heating section 14 is formed by a resistance wire, preferably of a heating conductor alloy, for example an FeCrAl alloy. The use of a polymer resistance material is also possible—a PTC polymer, in particular. The resistance wire used has an electric resistance of at least $0.2\ \Omega\text{mm}^2/\text{m}$, preferably at least $0.6\ \Omega\text{mm}^2/\text{m}$, particularly preferable at least $1.2\ \Omega\text{mm}^2/\text{m}$, in the exemplary embodiment shown of $1.44\ \Omega\text{mm}^2/\text{m}$. The heating section 14 is embedded by extrusion in the filter cup 5.1 made of plastic by injection molding, preferably in its bottom, and it is arranged in a plurality of windings, preferably in a meandering or coil form. Also possible is a resistance heating element in the form of interlacing of a resistance material.

In the heating system 11 shown, the filter cup 5.1 is connected with a tank cover for the defrosting vessel 3. A preferred one-piece design can do without a sealing point between tank cover and filter cup. It is here particularly advantageous when filter cup 5.1 and defrosting vessel 3 form a unit, according to FIG. 1, which is inserted in the storage tank 1 and thereby closes an opening of the storage tank 1.

The insert 11 is part of a urea supply system which comprises, aside from the storage tank 1, a pump 6 including pressure control and valve by means of which urea solution can be pumped via the intake lines 2 and 10 through the filter 5 via the connecting line 15 into the supply line 7 leading to the catalytic converter. In frosty weather, urea solution contained in the defrosting vessel 3 is first defrosted and then pumped via the intake line 10 into the filter 5 and from there to the connecting line 7. The capacity of the defrosting vessel 3 is dimensioned such that the urea solution contained therein is sufficient to start up a catalytic converter. After the urea solution in the defrosting vessel 3 has been completely defrosted, the heat generated by the tank heater 4 is also automatically supplied to urea solution outside of the defrosting vessel 3 and thus the entire contents of the storage tank 1 is defrosted so that urea solution can be pumped through the intake line 2 into the filter 5.

To support the defrosting process in the defrosting vessel 3, the defrosted urea solution can be returned via the return line 8 into the defrosting vessel 3 so that the heat generated by the heater 4 is distributed better in the defrosting vessel 3. Furthermore, the liquid passage opening 9 forms an overflow so that an excess of heated urea solution can escape from the defrosting vessel 3 and get into the surrounding interior space of the tank 1.

The intake line 10 is a plastic tube which passes as an intake duct through the tank heater 4. Preferably, the intake line 10 is also heatable so that the urea solution frozen therein can be quickly defrosted. In the exemplary embodiment shown in FIG. 1, intake line heating is realized such that, closely adjacent to the intake line 10, the connecting line 12 is provided and, in the corresponding section, it is also designed as a resistance heating element, particularly as a resistance wire. The connecting line 12 thus has a thermoconducting connection with the intake line 10 so that heat generated by the connecting line 12 can be used for defrosting urea solution in the intake line 10. The connecting line 12 may be adjacent to the intake line 10 or be coiled around it. A series connection is thus provided of tank heater 4, filter heater 14 and intake line heating. Due to the self-regulating effect of the PTC heating element of the tank heater 4, the filter heater 14 as well as the intake line heating are accordingly protected against overheating.

In the exemplary embodiment shown, only the connecting line 12 is designed as a resistance heating element. Yet, it is also possible to design the connecting line 13 as a resistance heating element as well to thus heat the intake line 10 and/or the filter 5 therewith. For example, one section of a connecting line can serve as filter heating and one section of the other connecting line as intake line heating.

Figure 2:
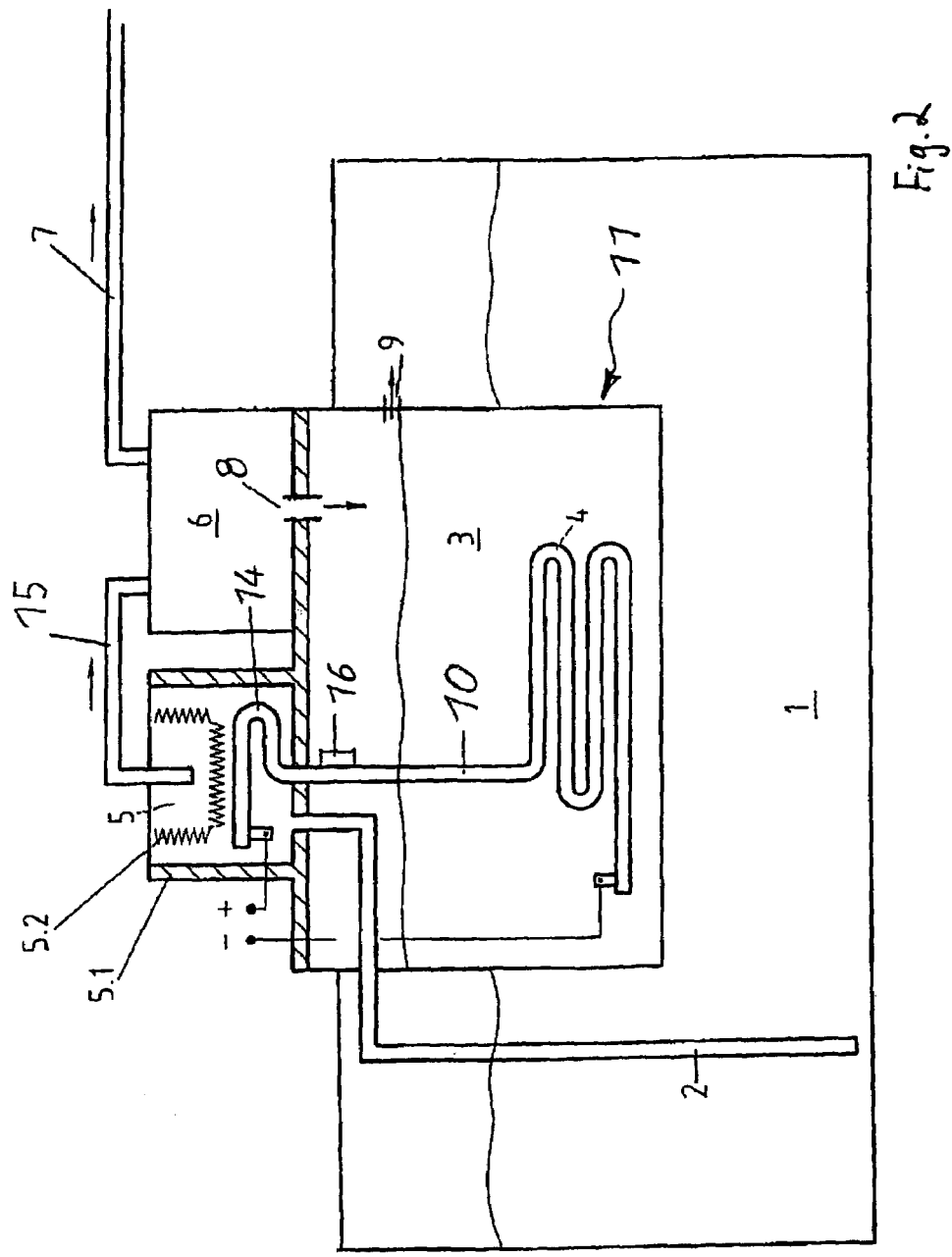
FIG. 2 shows a schematic presentation of another exemplary embodiment of a heating system according to the invention.

The exemplary embodiment shown in FIG. 2 essentially differs from the exemplary embodiment described on the basis of FIG. 1 that the intake line 10—through which urea solution from the defrosting vessel 3 can be drawn into the filter 5—is designed as a thin stainless steel tube, preferably of V4A steel, and serves as a resistance heating element. The intake line 10 thus simultaneously presents the tank heater 4.

The intake line 10 is arranged in the defrosting vessel 3 in a plurality of windings, preferably spiraling or meandering windings, and projects at its upper end with one also preferably coiled section into the filter 5. The specific resistance of the metal tube forming the intake line 10 is preferably at least 0.2 $\Omega mm^2/m$, in particular, at least 0.6 $\Omega mm^2/m$, and 0.75 $\Omega mm^2/m$ in the exemplary embodiment shown.

When a heating current is conducted through the metal tube forming the intake line 10, this will result in its heating up and thus in the defrosting of the urea solution surrounding the intake line 10 in the defroster vessel 3 and the filter 5. The section of the intake tube 10 projecting into the filter here serves not only as a filter heater 14 for heating the filter 5 but also as a connecting line of the tank heater 4. The metal tube forming the intake line 10 may be designed in one piece or may have a plurality of sections connected by couplings, for example plug-in couplings; said sections may be different in design with regard to material and diameter.

To avoid overheating of the intake tube 10, a temperature sensor 16 is provided in a thermoconducting connection to the intake tube, preferably fastened on the intake tube. It is particularly favorable to provide the temperature sensor 16 underneath the filter 5 since no urea solution generally surrounds the intake tube 10 there and the risk of overheating is therefore the highest. In case of overheating, the plastic of the filter cup 5.2 and the sealing point at the passage of the intake tube 10 might be damaged.

For both exemplary embodiments, it is favorable during operation when a heat output of approx. 10 to 30 watt is released by the filter heater, and a heat output of at least 50 watt, preferably 70 watt to 150 watt, by the tank heater.

To be able to supply liquid urea solution even faster to a catalytic converter, the heating system described can be integrated into a urea supply system in which the supply line 7 and/or the connecting line 15 are also heated. Such line heating can be particularly favorably effected such that corrosion-resistant metal tubes, preferably of stainless steel, are used for the corresponding lines through which a heating current is conducted for defrosting the urea solution so that the metal tubes heat up as resistance heating elements.

Figure 3:
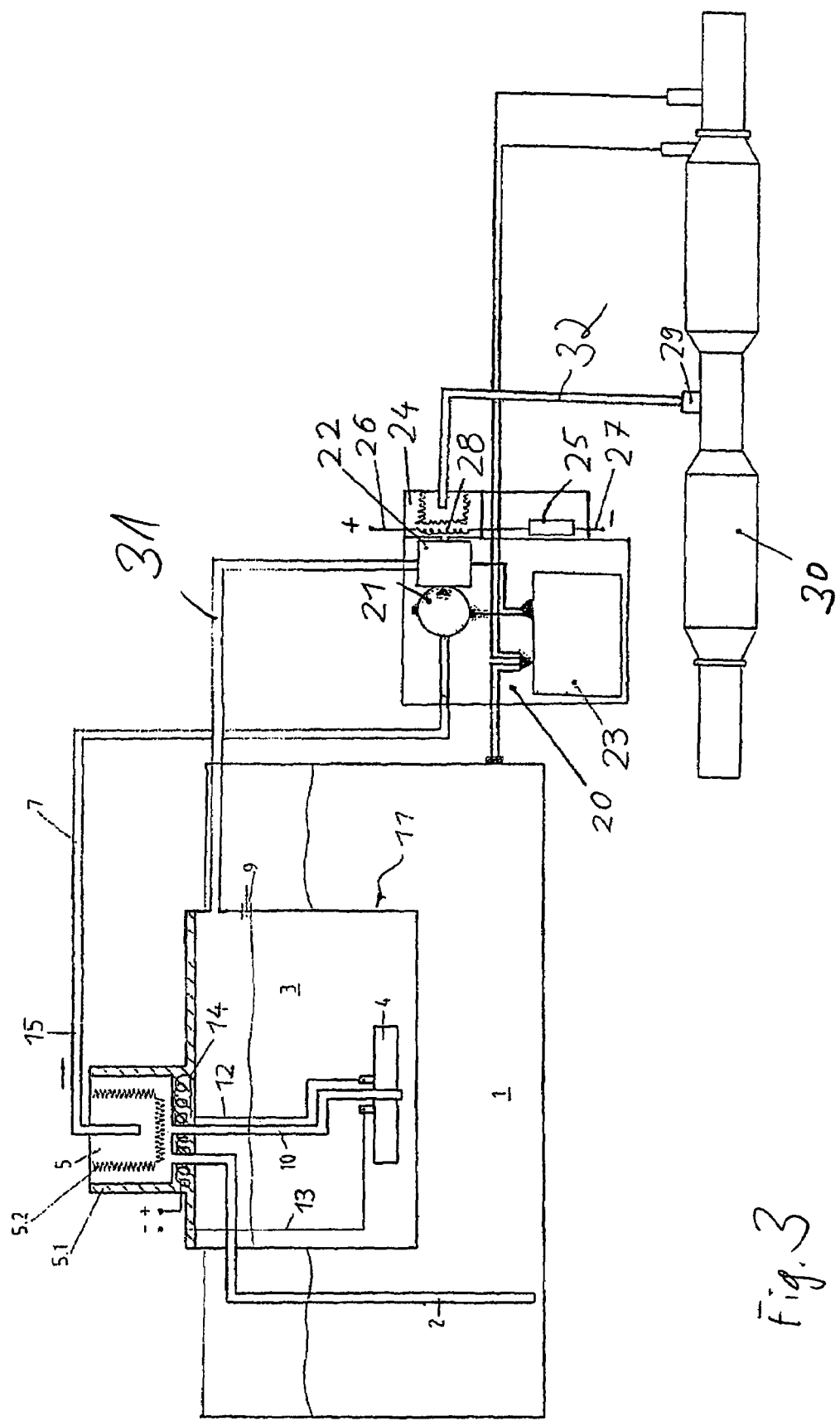
FIG. 3 shows a schematic presentation of a urea supply system with another exemplary embodiment of a heating system according to the invention.

FIG. 3 is a schematic presentation of a urea supply system for a catalytic converter of a motor vehicle. The urea supply system comprises as a first part a urea tank 1 with a filter which are heated by a heating system essentially corresponding to the heating system described on the basis of FIG. 1. The heating system of the first part is the tank heater 4 as the first heater for defrosting liquid.

The urea supply system shown in FIG. 3 comprises as a second part a conveyor module 20 by means of which urea solution can be pumped from the urea tank 1, 3 to a catalytic converter 30. The conveyor module 20 includes a conveyor pump 21 and a heating system which comprises, as a first heater, a conveyor module heater 25 and additionally a filter heater 28 for heating a filter 24 belonging to the conveyor module. The conveyor module 20 furthermore comprises a dosing valve 22 which is preferably heated, same as the pump 21, by the conveyor module heater 25. By means of the dosing valve 22, the urea solution supplied via the connecting line 7 is distributed to the supply line 32 leading from the filter 24 to the injection nozzle 29 of the catalyzer 30, and to a return line 31 leading to the urea tank 1, 3.

As another component, the conveyor module 20 comprises a control unit 23 which can control, for example, the pump 21, the dosing valve 22, as well as the heating system.

The most important function of the conveyor module heater 25 is the defrosting of liquid in the pump 21 in frost conditions so that the conveyor module heater 25 is a pump heater in the exemplary embodiment shown. The conveyor module heater 25 preferably contains a PTC heating element and can be provided, for example, in a housing of the pump 21 or of the conveyor module 20. In the schematic presentation of FIG. 3, the conveyor module heater 25 seems to be provided at a considerable distance from the conveyor pump 21. This schematic presentation has been chosen for better clarity; however, in this respect, it does not correspond with the actual conditions. The conveyor module heater 25 is preferably provided close to the conveyor pump 21 and has a good thermoconducting connection with the conveyor pump 21 via thermal bridges. Suitable thermal bridges can be particularly formed by housing parts.

The filter heater 28 is designed like the filter heaters 14 of the exemplary embodiments described on the basis of FIGS. 1 and 2. The filter heater 28 is thus formed by a heating section—designed as a resistance heating element—of the connecting line 26 of the conveyor module heater 25. Reference is also made to the corresponding description of FIG. 1 with regard to further details, for example in terms of the preferred materials or the arrangement of the heating section. Like the filter in the exemplary embodiment explained in the preceding part, the filter 24 preferably comprises a filter housing—for example, a filter cup—in which the filter heater 28 can be embedded.

It is particularly advantageous to design not only the heating section—forming the filter heater 28—of the connecting line 26 of the conveyor module heater 25 from resistance wire but to use such resistance wire for the complete connecting line 26 of the conveyor module 20. Accordingly, in the exemplary embodiments shown, the connecting line 12, 26 is formed by a resistance wire which extends up to the first heater 4, 25. The heater section of the connecting line 12, 26 forming the filter heater 14, 28 comprises windings so that the major part of the connecting line 12, 26 is provided in the filter 5, 24 and, consequently, the heat output released by the connecting line is released for the major part in the filter 5, 24.

The maximum power of the conveyor module heater 25 amounts to approx. 30 to 40 W in operation; the maximum power of the filter heater 28 to approx. 20 W to 40 W. At temperatures below freezing, the electric resistance of the first heater 4, is preferably higher than the electric resistance of the filter heater 14, 28.

What is claimed is:

1. Heating system for a liquid conveyor system comprising:
   at least one first heater, comprising a PTC element, for defrosting a liquid, said at least one first heater located within a tank or adjacent to a pump; and
   at least one filter heater for heating a filter for liquid filtering, said at least one filter heater comprising at least one winding embedded in a plastic filter cup, said at least one filter heater being connected in series with said at least one first heater, said at least one first heater heating the tank or pump and protecting the at least one filter heater in the plastic filter cup from overheating; and wherein the at least one filter heater is provided as a resistance heating element formed by a heating section of an electrical connecting line of the at least one first heater, wherein at temperatures below freezing the electric resistance of the at least one first heater is higher than the electric resistance of the at least one filter heater.

2. Heating system according to claim 1, wherein the first heater is a tank heater for heating a liquid tank.

3. Heating system according to claim 2, wherein the tank heater comprises an intake duct for conveying liquid into the filter.

4. Heating system according to claim 3, wherein the intake duct extends in the housing of the tank heater.

5. Heating system according to claim 3, wherein the intake duct leads to a heatable intake line which leads to the filter, with the tank heater, the filter heater and an intake line heater being connected in series.

6. Heating system according to claim 3, wherein the intake duct is formed by an intake tube of metal.

7. Heating system according to claim 6, wherein the intake tube serves as a resistance heating element for the tank heater.

8. Heating system according to claim 7, wherein a section of the intake tube projects into the filter and that this section is the electrical connecting line of the tank heater and serves as a resistance heating element.

9. Heating system according to claim 8, wherein the section of the intake duct projecting into the filter has at least one winding.

10. Heating system according to claim 2, wherein the tank heater is provided in a defrosting vessel for insertion into a tank and has at least one liquid passage opening for a liquid flow between the tank and the defrosting vessel.

11. Heating system according to claim 2, characterized in that the tank is a urea tank.

12. Heating system according to claim 1, wherein the first heater is a conveyor module heater for heating a conveyor module comprising a conveyor pump of the liquid conveyor system.

13. Heating system according to claim 1, wherein the filter heater is part of a heater insert which comprises a filter housing of the filter.

14. Heating system according to claim 12, wherein the filter housing is designed of one piece with a tank cover.

15. Heating system according to claim 12, wherein the filter housing is made of plastic and has a bottom in which the filter heater is embedded.

16. Heating system according to claim 1, comprising a temperature sensor to protect the filter from overheating.

17. Heating system according to claim 1, wherein the connecting line comprises a resistance wire.

18. Heating system according to claim 17, wherein the resistance wire extends up to the first heater.

19. Heating system according to claim 1, wherein the heating section of the connecting line comprises windings forming the filter heater.

20. Heating system for a liquid conveyor system comprising:
   at least one first heater, for defrosting a liquid, said at least one first heater located in a tank or adjacent to a pump; and
   at least one filter heater for heating a filter for liquid filtering, said at least one filter heater comprising at least one winding embedded in a plastic filter cup; and
   said at least one filter heater being provided as a resistance heating element formed by a heating section of an electrical connecting line of the at least one first heater, said filter heater being embedded in a wall of the plastic filter cup, wherein at temperatures below freezing the electric resistance of the at least one first heater is higher than the electric resistance of the at least one filter heater.

21. Heating system for a liquid conveyer comprising:
   a liquid tank;
   a filter cup adjacent to the liquid tank;
   a metal intake tube configured to convey liquid between the liquid tank to the filter cup, the metal intake tube projecting into both the liquid tank and the filter cup, where the metal intake tube is a resistance heating element heating both the liquid tank and the filter cup comprising a tank heater section located in the liquid tank and a filter heater section located in the filter cup, wherein the tank heater section is electrically in series with the filter heater section, and wherein the metal intake tube is in series with respect to fluid conduction between the liquid tank and the filter cup; and
   a temperature sensor disposed in a thermo conducting connection to the metal intake tube to avoid overheating of the metal intake tube, the temperature sensor attached to the metal intake tube and located in the liquid tank near the filter cup.

* * * * *